US009670826B2

(12) United States Patent
Gabel

(10) Patent No.: US 9,670,826 B2
(45) Date of Patent: Jun. 6, 2017

(54) SELF-IGNITING INTERNAL COMBUSTION ENGINE HAVING PISTON RECESSES HAVING SWIRL STEPS

(75) Inventor: Klaus Gabel, Ludwigsburg (DE)

(73) Assignee: AUDI AG, Ingolstadt (DE)

( * ) Notice: Subject to any disclaimer, the term of this patent is extended or adjusted under 35 U.S.C. 154(b) by 842 days.

(21) Appl. No.: 13/812,452

(22) PCT Filed: Jul. 13, 2011

(86) PCT No.: PCT/EP2011/003488
§ 371 (c)(1),
(2), (4) Date: Feb. 20, 2013

(87) PCT Pub. No.: WO2012/013297
PCT Pub. Date: Feb. 2, 2012

(65) Prior Publication Data
US 2013/0199498 A1    Aug. 8, 2013

(30) Foreign Application Priority Data
Jul. 28, 2010   (DE) .................. 10 2010 032 442

(51) Int. Cl.
F02B 15/00      (2006.01)
F02B 23/06      (2006.01)
(Continued)

(52) U.S. Cl.
CPC .......... *F02B 15/00* (2013.01); *F02B 23/0621* (2013.01); *F02B 23/0651* (2013.01);
(Continued)

(58) Field of Classification Search
CPC .. F02B 15/00; F02B 23/0669; F02B 23/0651; F02B 23/0621; F02B 23/0672; F02F 3/26; F02M 61/1826; Y02T 10/125
See application file for complete search history.

(56) References Cited

U.S. PATENT DOCUMENTS 2,722,921 A * 11/1955 Lang .............................. 123/256
3,872,841 A *  3/1975 Kimbara et al. ............... 123/263
(Continued)

FOREIGN PATENT DOCUMENTS

DE      103 29 524 A1    2/1998
DE       41 27 617 C1    6/1999
(Continued)

OTHER PUBLICATIONS

International Search Report issued by the European Patent Office with regard to the corresponding International Patent Application No. PCT/EP2011/003488.
(Continued)

*Primary Examiner* — Hieu T Vo
*Assistant Examiner* — Sherman Manley
(74) *Attorney, Agent, or Firm* — Henry M. Feiereisen LLC

(57) ABSTRACT

A self-igniting internal combustion engine includes at least one cylinder and a piston, which can be moved back and forth in the cylinder and which bounds a combustion chamber together with the cylinder and which has a piston recess facing the combustion chamber, said piston recess having flow cross-sections that vary in a circumferential direction of the cylinder and of the piston, and comprising an injector arranged centrally above the piston recess for injecting fuel into the piston recess, wherein the injector has a plurality of injection openings. In order to reduce the emissions and in particular the soot emissions of the internal combustion engine, at least some of the injection openings have different opening cross-sections, wherein the injection openings having the different opening cross-sections are directed at areas of the combustion chamber recess having different flow cross-sections.

11 Claims, 8 Drawing Sheets

(51) Int. Cl.
*F02F 3/26* (2006.01)
*F02M 61/18* (2006.01)

(52) U.S. Cl.
CPC ...... *F02B 23/0669* (2013.01); *F02B 23/0672* (2013.01); *F02F 3/26* (2013.01); *F02M 61/1826* (2013.01); *Y02T 10/125* (2013.01)

(56) References Cited

U.S. PATENT DOCUMENTS

| | | | |
|---|---|---|---|
| 5,158,055 A * | 10/1992 | Oh et al. | 123/276 |
| 5,215,052 A | 6/1993 | Augustin | |
| 5,645,225 A * | 7/1997 | Hasegawa et al. | 239/533.12 |
| 6,152,101 A * | 11/2000 | Parsi | 123/276 |
| 6,336,437 B1 * | 1/2002 | Baika et al. | 123/298 |
| 6,553,960 B1 | 4/2003 | Yoshikawa et al. | |
| 6,644,268 B2 * | 11/2003 | Konig et al. | 123/299 |
| 7,225,791 B2 | 6/2007 | Blessing et al. | |
| 7,243,862 B2 * | 7/2007 | Dingle | 239/533.2 |
| 7,441,535 B2 * | 10/2008 | Yuzaki et al. | 123/276 |
| 2004/0123832 A1 * | 7/2004 | Quigley et al. | 123/276 |
| 2005/0224605 A1 * | 10/2005 | Dingle | 239/533.2 |
| 2006/0090726 A1 * | 5/2006 | Meffert et al. | 123/279 |
| 2009/0025681 A1 | 1/2009 | Takahashi et al. | |
| 2009/0205607 A1 * | 8/2009 | Levy | 123/276 |
| 2011/0253094 A1 * | 10/2011 | Rothbauer et al. | 123/276 |
| 2011/0271931 A1 * | 11/2011 | Rothbauer et al. | 123/279 |

FOREIGN PATENT DOCUMENTS

| | | |
|---|---|---|
| DE | 695 11 506 T2 | 4/2000 |
| DE | 199 22 964 A1 | 11/2000 |
| DE | 2 343 023 A | 3/2009 |
| EP | 1 676 997 A1 | 7/2006 |
| EP | 1 876 332 A1 | 1/2008 |
| EP | 2 112 348 A2 | 10/2009 |
| FR | 2 887 586 A1 | 12/2006 |
| JP | H02 233822 A | 9/1990 |
| JP | 5 106442 A | 11/2000 |

OTHER PUBLICATIONS

German Search Report issued by the German Patent Office with regard to the corresponding German Patent Application No. DE 10 2010 032 442.6.

* cited by examiner

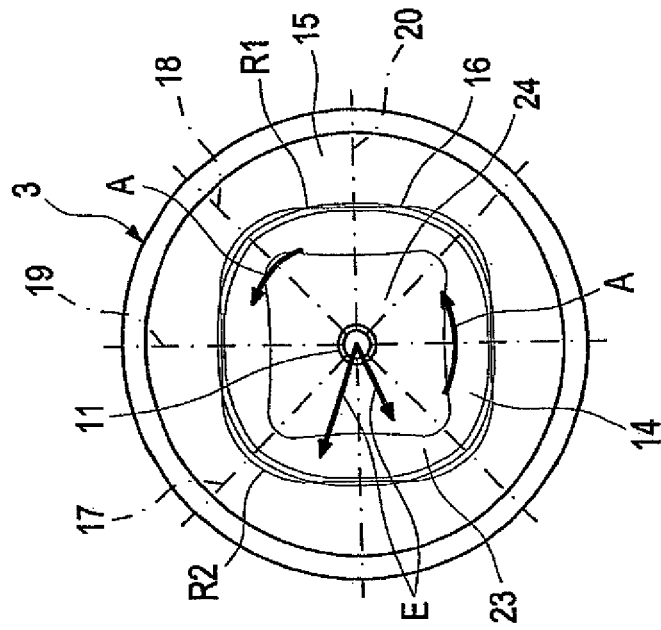
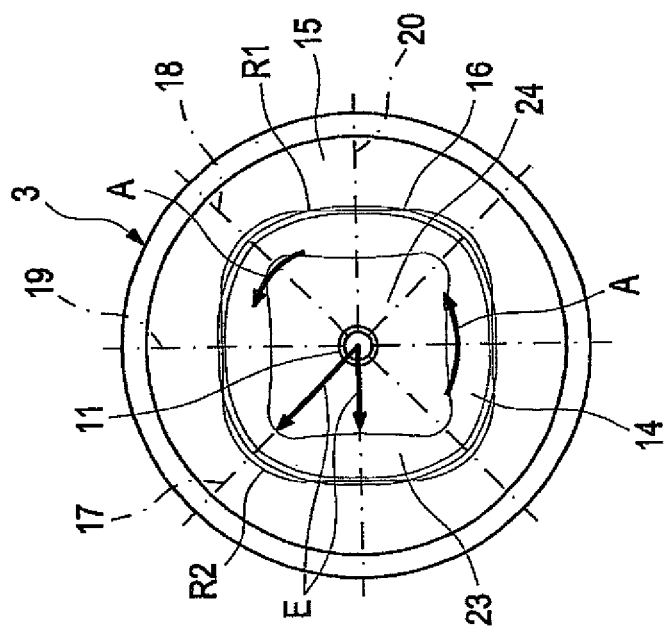

SELF-IGNITING INTERNAL COMBUSTION ENGINE HAVING PISTON RECESSES HAVING SWIRL STEPS

CROSS-REFERENCES TO RELATED APPLICATIONS

This application is the U.S. National Stage of International Application No. PCT/EP2011/003488, filed Jul. 13, 2011, which designated the United States and has been published as International Publication No. WO 2012/013297 A2 and which claims the priority of German Patent Application, Serial No. 10 2010 032 442.6, filed Jul. 28, 2010, pursuant to 35 U.S.C. 119(a)-(d).

BACKGROUND OF THE INVENTION

The invention relates to a self-igniting internal combustion engine.

Self-igniting diesel fueled internal combustion engines of motor vehicles have significantly higher soot emissions compared to gasoline operated internal combustion engines of motor vehicles. Because these soot emissions significantly contribute to fine dust contamination of the air, great efforts are made to lower soot emissions. The same is true for other pollutant emissions of internal combustion engines of motor vehicles such as for example nitrogen oxide emissions. One possibility for lowering pollutant emissions of internal combustion engines is to influence the combustion in the combustion chambers of the cylinders in such a way so as to ensure a complete reaction of the injected fuel with the oxygen in the combustion air into carbon dioxide and water vapor. However, a complete reaction is only possible when fuel and combustion air are well intermixed in the combustion chamber. This intermixing depends inter alia on the geometry of the piston or combustion chamber recess, which is arranged opposite the injector in the front side of the piston.

In order to increase turbulence of the flow of the combustion air inside the piston—or combustion recess and with this the swirling, of the fuel which is injected into the combustion chamber to thereby ensure a better combustion of the fuel, internal combustion engines have previously been proposed in which the piston—or internal combustion recess of the pistons generally has an angled or polygonal contour or circumference. This recess shape is intended to cause turbulences to form in the corners of the piston—or combustion recess, which counteract the main flow or interact with the main flow in other ways in order to ensure a better intermixing of combustion air and fuel due to the forming turbulences.

From DE-A2 343 023, an internal combustion engine of the previously mentioned type is already known in which for improving the distribution and atomization of the injected fuel, the piston—or combustion recess has a generally square contour with rounded corners, while the injector is provided with four injection openings, which are arranged in angular distances of 90 degrees and oriented so that the fuel which is ejected from the injection openings impacts the boundary surface of the piston—or combustion recess before the rounded corners at an oblique angle when viewed in the direction of flow or swirl.

Based on the foregoing, the invention is based on the object to improve an internal combustion engine of the previously mentioned type so that the emissions and in particular the soot emissions of the internal combustion engine can be further decreased.

SUMMARY OF THE INVENTION

According to the invention, this object is solved in that the injection openings of the injector have different opening cross sections, and in that the injection openings with the different opening cross sections are directed toward regions of the combustion recess which have different flow cross sections.

The invention is based on the idea that the different opening cross sections of the injection openings of the injector at same rail pressure and same injection duration cause different injected masses with different drop spectra and evaporation rates. As a result, the injection jets also have different swirl requirements which is accounted for by the orientation of the injection openings or the injection jets toward regions with different flow cross sections and with this different flow velocities of the combustion air flowing through the combustion recess.

Preferably the orientation of the injection openings is selected so that the injection jets with higher swirl requirements i.e., the injection jets from the injection openings with the smaller opening cross sections are respectively deflected in a direction in which the piston—or combustion recess has a smaller flow cross section and therefore the flow velocities of the combustion air in the recess is greater, while injection jets with lower swirl requirement i.e. the injection jets from the injection openings with the larger opening cross sections are respectively guided in a direction in which the piston—or combustion recess has a greater flow cross section and thus the flow velocities of the combustion air in the recess are smaller. The swirl requirement of the injection jets depends on the penetration depth and on the evaporation speed of the injection jets and is the smaller the greater the penetration depth is or the longer the evaporation takes. The penetration depth of the injection jet and the time required for its evaporation in turn increase with increasing opening cross section of the injection opening.

The measure according to the invention allows combining the advantages of injection openings with larger opening cross sections at full capacity with the advantages of injection openings with smaller opening cross sections at partial capacity. Further, the air in the combustion chamber can be better captured and mixed with the fuel, which leads to a faster combustion with lower nitrogen oxide and soot emissions.

In order to realize the different flow cross sections inside the piston or combustion chamber recess, the recess can be formed so that the outer circumferential surfaces of the recess which are opposed to the injection openings with the different opening cross sections have different radial distances to the injector and/or different depth. Preferably, the distances and/or depth are greater in the region of the injection openings with the greater opening cross sections so that correspondingly greater flow cross sections are present at this location, while they are smaller in the region of the injection openings with the smaller opening cross sections, so that correspondingly smaller flow cross sections are present at this location.

A further preferred embodiment of the invention provides that the injector has multiple pairs of injection openings which each include an injection opening with greater opening cross section and an injection opening with smaller opening cross section. The injection openings with the greater opening cross section and the injection opening with the smaller opening cross section alternate in circumferential direction of the cylinder and the piston, wherein the injection openings with the greater opening cross section are directed to regions of the piston recess with a greater flow cross section and the injection openings with the smaller opening cross sections are directed to region s of the piston recess with a smaller flow cross section. Neighboring injection openings of same size have preferably the same angular distance as neighboring regions of the piston or combustion chamber recess in which the flow cross section has a maximum or a minimum. Advantageously the piston or combustion chamber recess has multiple diametrical plane of symmetry whose number corresponds to the number of pairs of injection openings and is expediently four. The flow cross sections of the piston or combustion chamber recess have a maximum or minimum in the planes of symmetry and increase or decrease again from there up to the neighboring plane of symmetry.

Advantageously, all injection openings of the injector are arranged in a plane which is perpendicular to the longitudinal center axis of the cylinder and the piston and point obliquely downward in the direction of the piston or combustion chamber recess wherein they are directed towards opposing circumferential surfaces of the recess.

A particularly preferred embodiment of the invention provides that the piston or combustion chamber recess has a contour or circumference which generally corresponds to a rounded polygon with rounded corners and expediently corresponds to a square. Advantageously, the sides of the polygon or square are also curved slightly convex outwardly wherein however the radius of curvature in the regions with greater flow cross section, i.e., at the corners of the rounded polygon or square is smaller than in the regions with smaller flow cross section, i.e., at the sides of the rounded polygon or square.

Advantageously, the outer circumferential surfaces of the piston or combustion chamber recess have no discontinuities, so that inside the recess a detachment of the air flow from the circumferential surfaces and with this the formation of secondary swirls can be avoided as far as possible.

According to a further advantageous embodiment of the invention the piston or combustion chamber recess has a key shaped cross section with an extended bulge portion and a narrowed neck portion, which is arranged between the extended bulge portion and a slightly extended point of entry of the combustion chamber recess into a plane front surface of the piston. In the center of the piston or combustion chamber recess a generally pyramid shaped projection with rounded corners and a rounded tip is advantageously located which protrudes over a bottom of the recess and whose circumferential surfaces together with the outer circumferential surfaces of the recess delimit the different flow cross sections inside the recess.

The circumferential surfaces of the generally pyramid shaped projection can advantageously extend parallel to the sides of the generally polygonal circumference of the piston or combustion chamber however, it is also possible to rotate the projection about the longitudinal center axis of the cylinder and the piston so that its rounded corner are opposed to the sides of the generally polygonal circumference of the recess.

BRIEF DESCRIPTION OF THE DRAWING

In the following, the invention is explained in more detail by way of several exemplary embodiments shown in the drawing. It is shown in FIG. 1 a simplified cross sectional view of a cylinder of a piston and an injector of an internal combustion engine according to the invention;

FIGS. 3a and 3b plan views onto an upper front side of the piston with the piston recess, wherein the injector is not shown to illustrate two preferred orientations of injection openings relative to the piston recess;

DETAILED DESCRIPTION OF PREFERRED EMBODIMENTS

Figure 1:
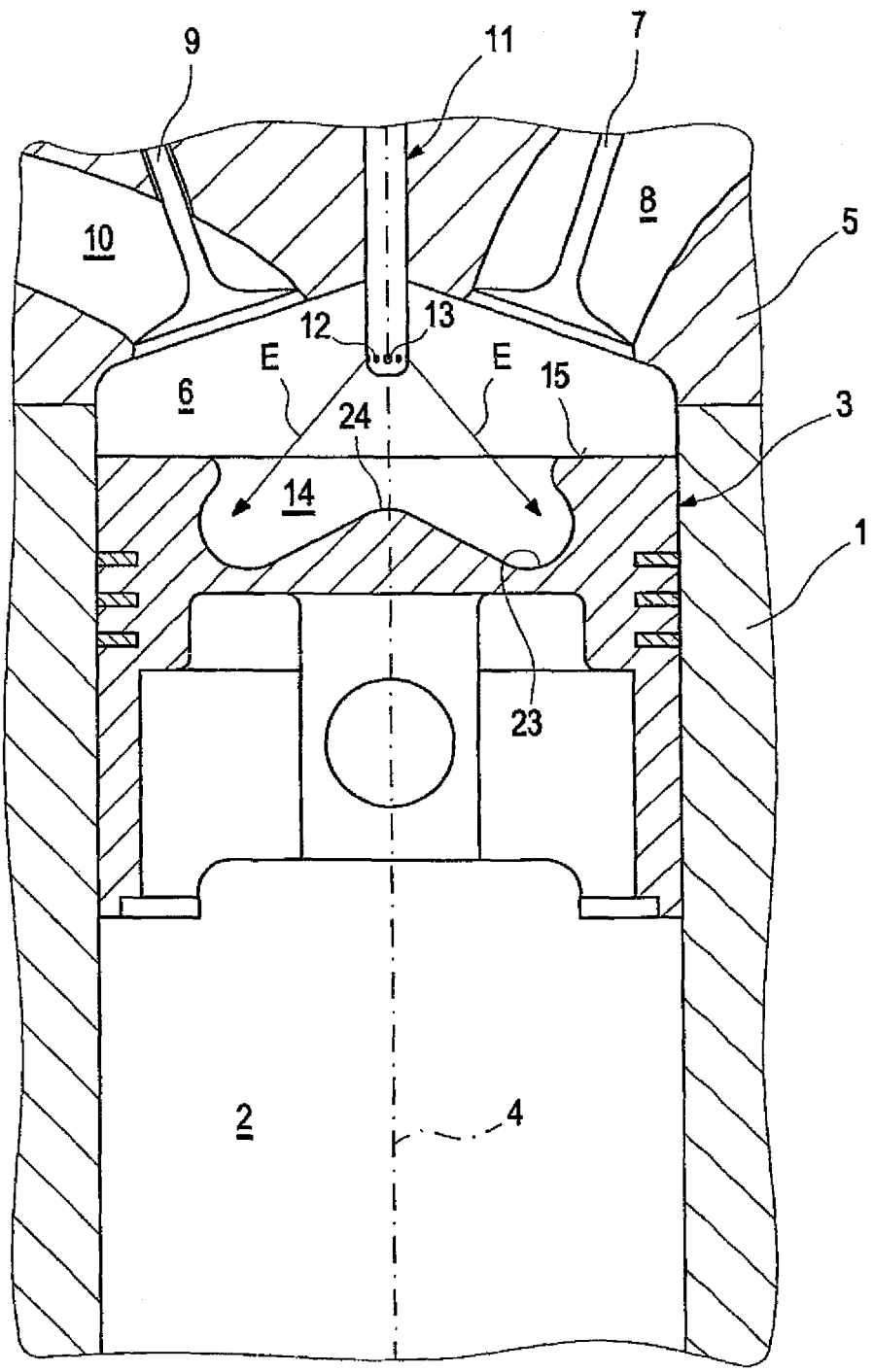

In the cylinder 2 shown in FIG. 1 which is recessed in a cylinder crank case 1 of a diesel internal combustion engine, a piston 3 is movable back and forth along a longitudinal center axis 4 of the cylinder 2 and the piston 3.

Figure 14:
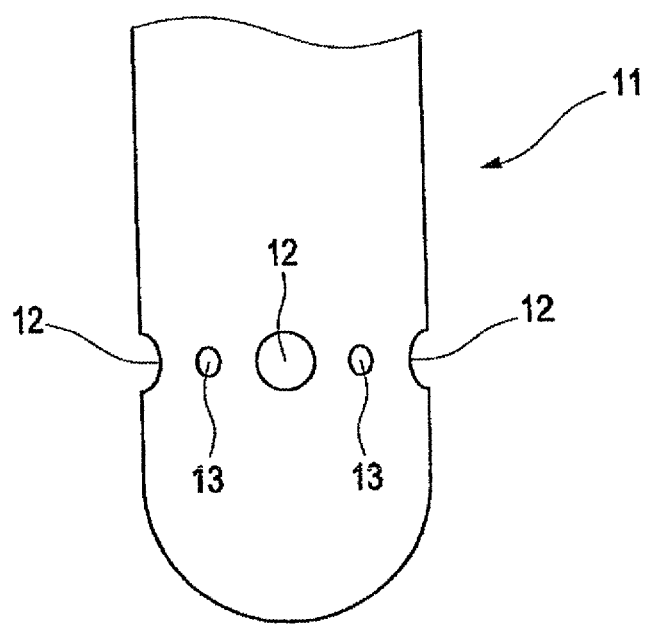
FIG. 14 an enlarged side view of the lower end of the injector.

The cylinder 2 and the piston 3 together with a cylinder head 5 of the internal combustion engine, delimit a combustion chamber 6. An inlet channel 8 which is closable by an inlet valve 7 serves for conducting combustion air into the combustion chamber 6. An outlet channel 10 which is closable by an outlet valve 9 serves for discharge of combustion gases out of the combustion chamber 6. An injector 11 serves for injecting diesel fuel into the combustion chamber 6, which injector 11 is inserted into a bore of the cylinder head 5 which bore is coaxial to the longitudinal center axis 4 and protrudes from above into the combustion chamber 6. At its free end, the injector 11 has overall eight injection openings 12, 13 which are arranged about the longitudinal center axis 4 in angular distances of 45 degrees in a plane which is perpendicular to the longitudinal center axis 4. The injection openings which have a circular cross section and are oriented obliquely downwards have pair wise different opening cross sections, as best shown in FIG. 14, wherein in circumferential direction of the injector 11 always one injection opening 13 with a smaller diameter is arranged between two injection openings 12 with greater diameter, and vice versa.

In its upper front side facing the combustion chamber 6, the piston 3 has a piston recess 14 which is open towards the top, and which is surrounded by a generally ring shaped, plane front surface 15 of the piston 3 which front surface neighbors the cylinder 2.

The piston recesses 14 shown in FIGS. 1 to 5 and 10 to 13 have a contour or circumference 16 which in relation to the longitudinal center axis 4 of the cylinder 2 and the piston 3 is not rotationally symmetric, but in plan view has the shape of a square with four equally long convexly outwardly curved sides with a greater radius of curvature R1 and four rounded corners with a smaller radius of curvature R2. In plan view, the recess 14 is mirror symmetrical relative to four planes of symmetry 17, 18, 19, 20 which are arranged at angular distances of 45 degrees, two of which 17, 18 extend through the longitudinal center axis 4 and the centers of the rounded corners of the square and two 19, 20 through the longitudinal center axis 4 and the centers of the sides of the square, as best shown in FIGS. 3a, 3b and 11 and 13.

The piston recesses 14 shown in FIGS. 6 to 9 on the other hand have a circular contour or circumference 16 which is rotationally symmetric relative to the longitudinal center axis 4 of the cylinder 2 and the piston 3.

As best shown in FIGS. 1, 2, 4, 6, 7, 10 and 12, all piston recesses have generally a key shaped cross section, wherein their outer circumference 16 has an extended bulge portion 21 and a neck portion 22 which is slightly narrowed relative to the bulge portion 21, and which is arranged above the bulge portion 21 between the bulge portion 21 and the front surface 15 of the piston 3 and slightly widens toward the front surface 15.

Figure 5:
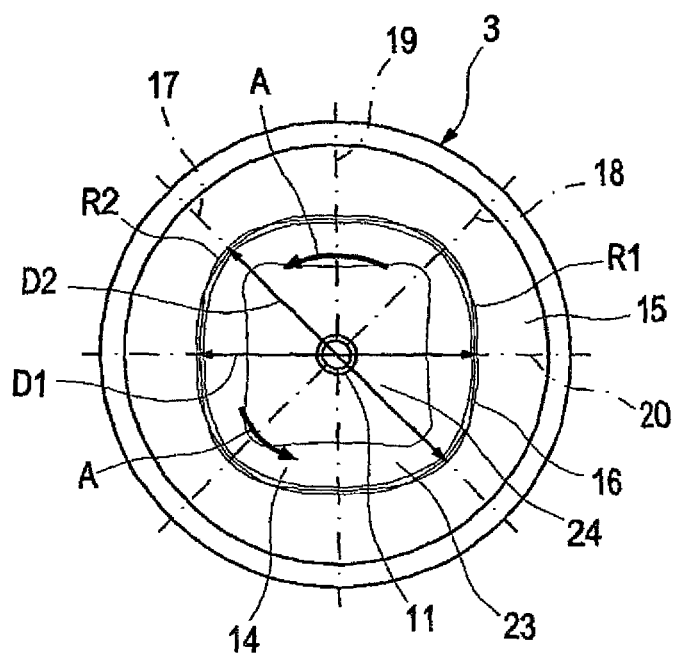
FIG. 5 a plan view onto the upper front side of the piston with the piston recess from FIG. 4, wherein the injector is also shown.
Figure 6:
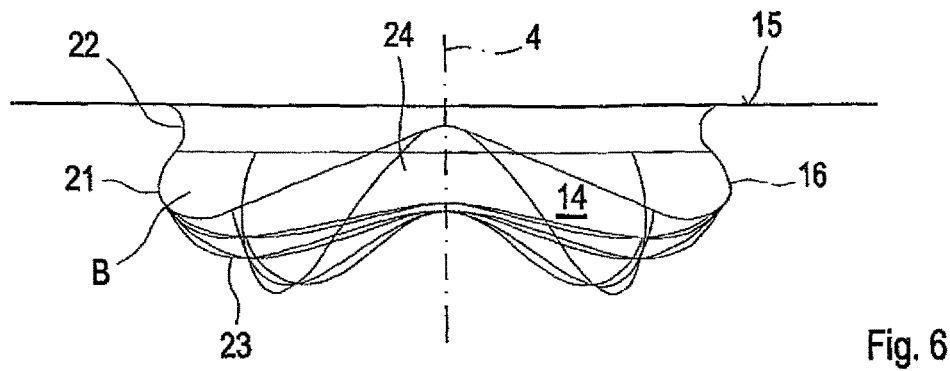
FIG. 6 a cross sectional view of another alternative piston recess of the piston.
Figure 7:
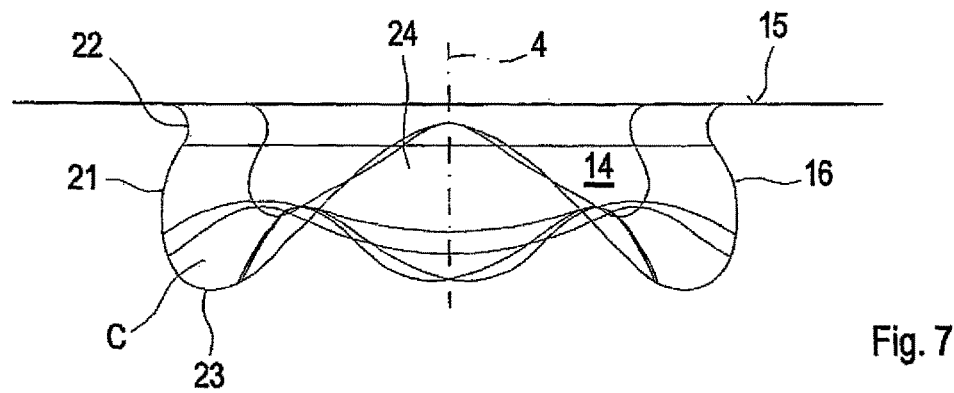
FIG. 7 another cross sectional view of the piston recess of FIG. 6.
Figure 8:
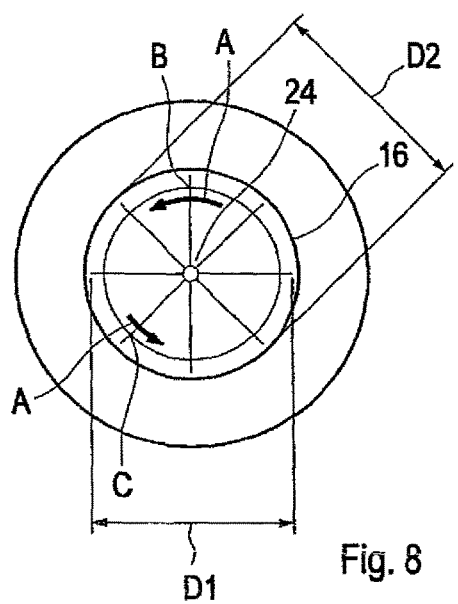
FIG. 8 a plan view onto the lower front side of the piston with the piston recess of FIG. 6.
Figure 9:
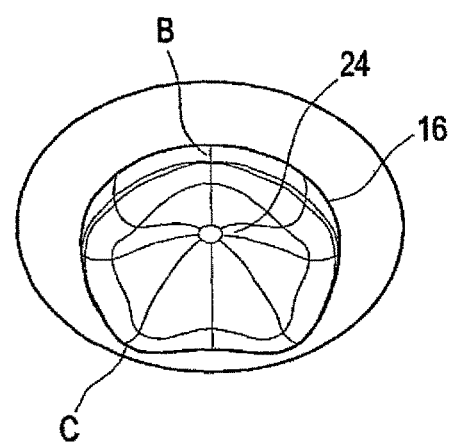
FIG. 9 a perspective view of the upper front side of the piston with the piston recess of FIG. 6.
Figure 10:
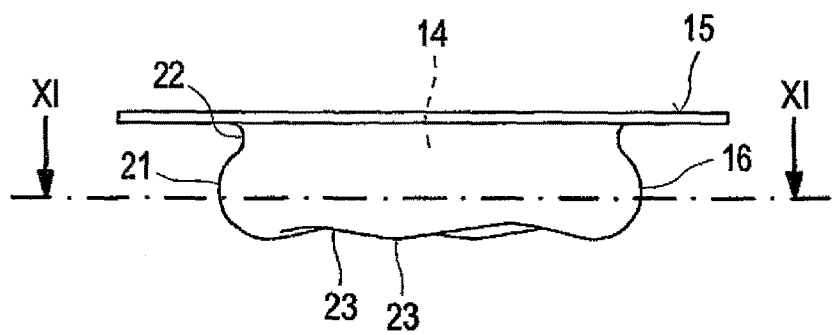
FIG. 10 a side view of a further alternative piston recess.
Figure 11:
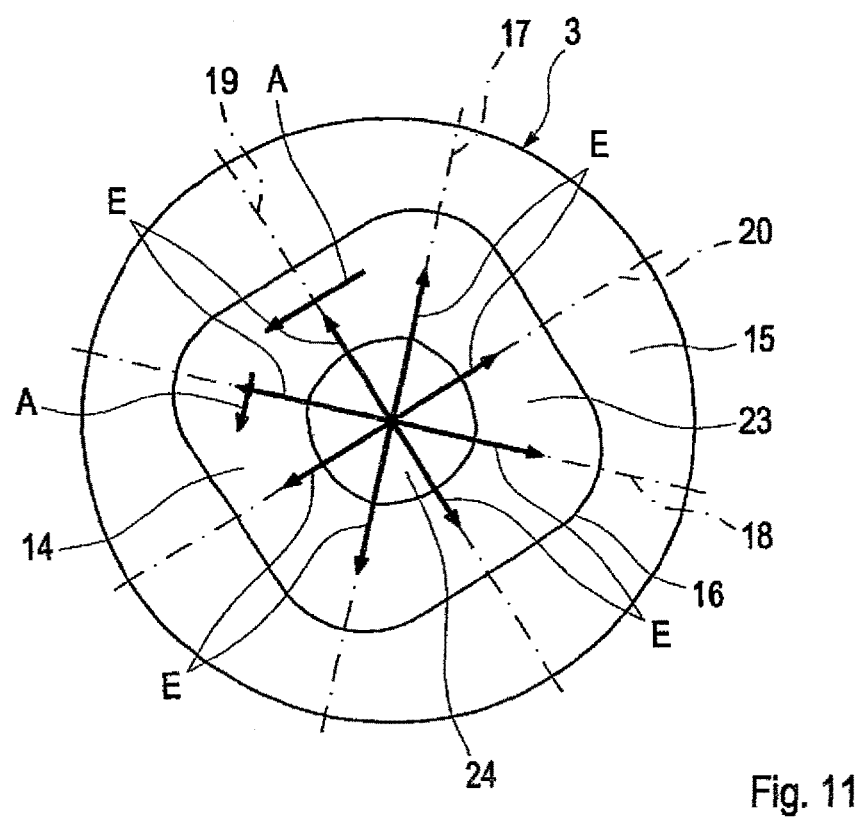
FIG. 11 a sectional view taken along line XI-XI of FIG. 10.
Figure 12:
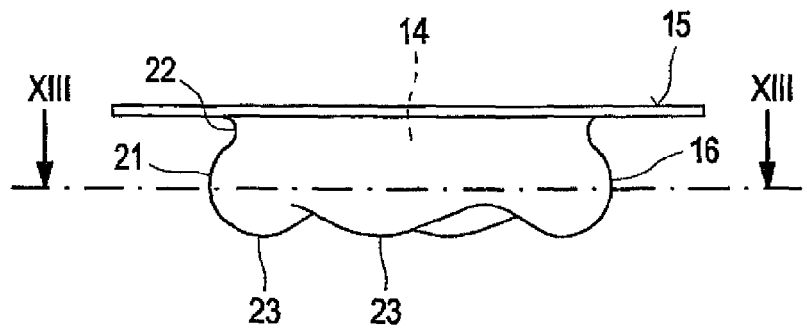
FIG. 12 a side view of yet a further alternative piston recess of the piston.
Figure 13:
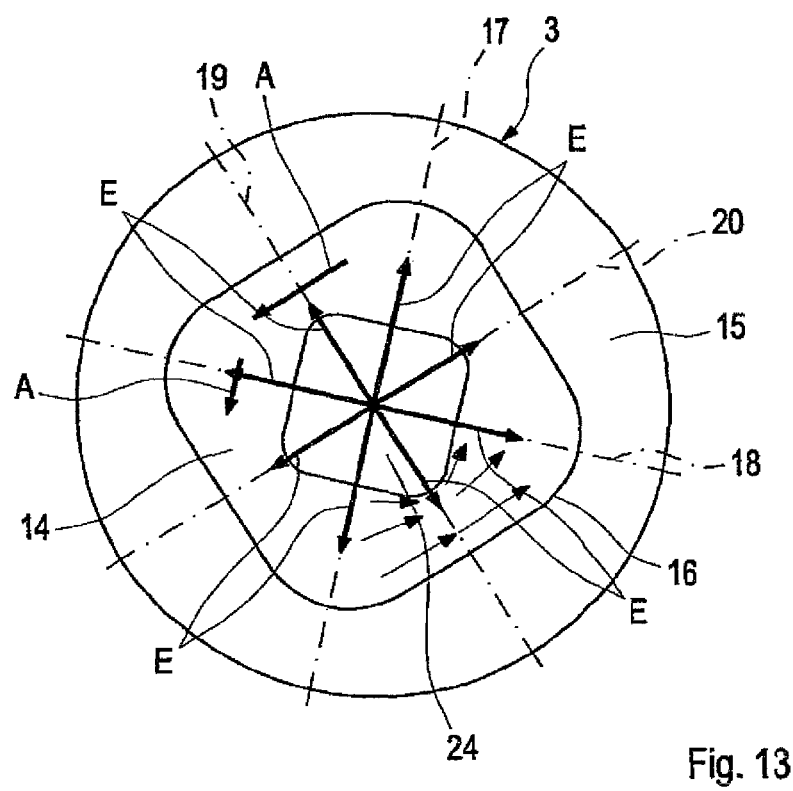
FIG. 13 a side view taken along line XIII-XIII of FIG. 12.

In their center, all piston recesses 14 have a projection 24 which protrudes upwards over a bottom 23 of the piston recess 14 and has generally the shape of a square pyramid with rounded corners and a rounded tip as best shown in FIGS. 1, 2, 4, 6 and 7. The tip of the pyramid is arranged below the injector 11 on the longitudinal center axis 4 of the cylinder 2 and the piston 3. The four sides of the pyramid between the rounded corners can generally be plane (FIG. 13), slightly convexly curved outwardly in the direction of the circumference 16 of the piston recess (FIG. 11) or slightly concavely curved inwardly in the direction of the longitudinal center axis 4 (FIGS. 3a, 3b and 5). The sides and the corners of the pyramid can depending on depth and cross sectional dimension of the piston recess 14 have a steeper (FIG. 7) or shallower (FIG. 6) inclination. The pyramid can be oriented so that its rounded corners are mirror symmetrical to the planes of symmetry 17, 18 through the centers of the rounded corners of the piston recess 14, as shown in FIG. 11. As an alternative, the pyramid can also be oriented so that its rounded corners are mirror symmetrical to the planes of symmetry 19, 20 through the sides of the piston recess 14, as shown in FIG. 13.

The piston recess 14, due to its generally square contour when viewed in circumferential direction of the cylinder 2 and the piston 3, has different cross sectional dimensions or diameters D, which vary between a smallest diameter D1 and a greatest diameter D2 on the planes of symmetry 17, 18 through the centers of the rounded corners of the piston recess 14 and respectively continuously increase or decrease between neighboring planes of symmetry. The diameter D at a defined angular position is the greatest distance between the longitudinal center axis 4 and the circumference 16 at this angular position.

Figure 2:
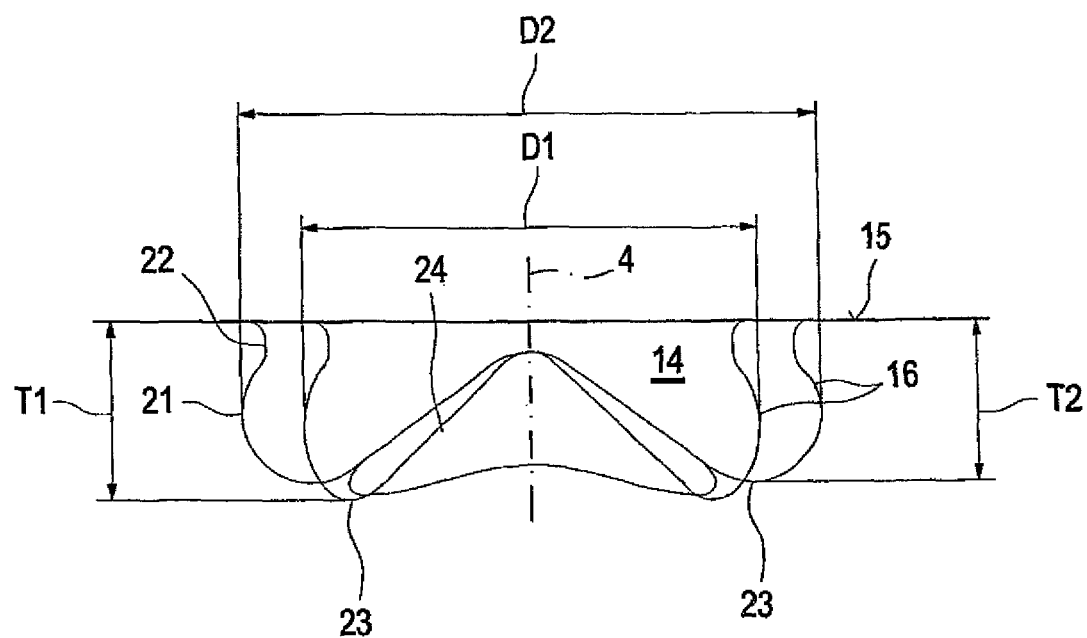
FIG. 2 superimposed cross sectional view of a piston recess of the piston in two different sectional planes.
Figure 4:
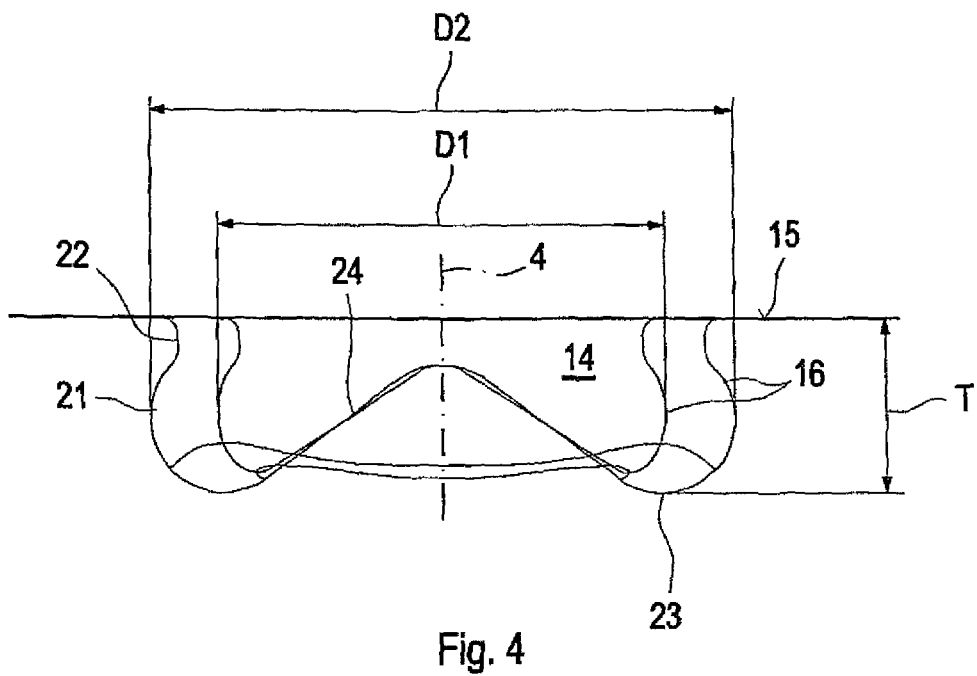
FIG. 4 superimposed cross sectional views of an alternative piston recess in two different cross sectional planes corresponding to FIG. 2.

The piston recess 14 can have a depth T along its entire circumference. As an alternative, the piston recess 14 can have varying depth T in circumferential direction of the cylinder 2 and the piston 3, as shown in FIG. 2 as well as 6 and 7, where shallower regions B and deeper regions C alternate. In the piston recess 14 shown in FIG. 2, the depth T in the region of the diameters D1 or on the planes of symmetry 19, 20 has a maximum T1 and in the region of the diameters D2 or on the planes of symmetry 17, 18 a minimum T2.

Due to the different cross sectional dimensions or diameters D and/or the different depth T of the piston recess 14, the piston recess 14 has varying flow cross sections between the pyramid shaped projection 24 and its outer circumference 16. In the piston recesses in FIGS. 1 to 5 and 10 to 13, the maxima or the flow cross sections respectively lie in the planes of symmetry 17, 18 while the minima respectively lie in the planes of symmetry 19, 20. This also causes the flow velocity of the combustion air which is conducted through the inlet channel 8 into the combustion chamber 6 with a swirl to change, which combustion air flows in the direction of the arrows A in the drawing, i.e., counter clockwise about the pyramid shaped projection 24 through the piston recess 14 as indicated by the differently long arrows A. Because the outer circumference 16 of the piston recess 14 has no discontinuities viewed in circumferential direction of the piston 3, essentially no secondary turbulences are generated in the piston recess 14.

As best shown in FIGS. 3a and 3b by two arrows E of different lengths and in FIGS. 11 and 13 by eight arrows E with two different lengths, the differently sized injection openings 12, 13 of the injector 11 are directed toward regions of the piston recess 14 which have different flow cross sections.

In the piston recess s14 shown in FIG. 3a, the injection openings 12, 13 are arranged so that the injection jets which exit from the greater injection openings 12 and have the smaller swirl requirement and are designated with the arrow E, lie in one of the planes of symmetry 17, 18 through the centers of the rounded corners of the piston recess 14 and are thus directed toward regions of the piston recess 14 with the greatest flow cross sections and with this the smallest flow velocities. The injection jets designated with the shorter arrow E which exit from the smaller injection openings and which have a greater swirl requirement lie in one of the planes of symmetry 19, 20 through the centers of the sides of the piston recess 14 and are thus directed towards regions of the combustion recess with the smallest flow cross sections and with this the greatest flow velocities. Viewed in a plan view, all injection jets are directed towards the piston 3 perpendicular to the opposing circumferential surface of the piston recess 14.

The same applies to the piston recesses 14 shown in FIGS. 11 and 13 in which injection jets from the great or small injection openings 12, 13 are also indicated by arrows E of different lengths and the flow velocities are indicated by arrows A of different lengths.

In the piston recess 14 shown in FIG. 3b on the other hand, the injection openings 12, 13 are arranged so that the injection jets (longer arrow E) which exit from the greater injection openings 12 and the injection jets (shorter arrow E) which exit from the smaller injection openings 13 enclose acute angles with the two neighboring planes of symmetry 17, 20; 20, 18. These angles in piston recess 14 of FIG. 3b are each 22.5 degrees so that all injection jets in the plan view shown in FIG. 3b are oriented toward the piston 3 at an angle of 67.5 degrees relative to the opposing circumferential surface of the recess 14.

3-D simulations have shown that with the arrangements shown in FIG. 3a and FIG. 3b the pollutant emission and in particular the soot emissions of the internal combustion engine can be particularly strongly reduced.

The invention claimed is:

1. A self-igniting internal combustion engine, comprising:
   at least one cylinder;
   a piston movable within the cylinder, said piston together with the cylinder delimiting a combustion chamber, said piston having a piston recess facing toward the combustion chamber, said piston recess having flow cross sections which vary in a circumferential direction of the cylinder and the piston; and
   an injector for injection of fuel into the piston recess, said injector being arranged centrally above the piston recess and having multiple injection openings, wherein at least some of the injection openings have different opening cross sections, and are respectively directed toward regions of the combustion recess having different said flow cross sections.

2. The self-igniting internal combustion engine of claim 1, wherein the at least some of the injection openings are respectively directed towards regions of the piston recess which differ from one another with regard to a distance between an outer circumference of the piston recess and a longitudinal center axis of the cylinder and the piston.

3. The self-igniting internal combustion engine of claim 1, wherein the at least some of the injection openings are respectively directed towards regions of the piston recess which differ from one another with regard to a depth of the piston recess.

4. The soft-igniting internal combustion engine of claim 1, wherein the injector has multiple pairs of injection openings, each of said pairs including an injection opening having a greater opening cross section and an injection opening having a smaller opening cross section, and wherein the injection openings having the greater opening cross section alternate with the injection openings having the smaller opening cross section.

5. The self-igniting internal combustion engine of claim 4, wherein the injection openings having the greater opening cross section are directed toward regions of the piston recess with a grater flow cross section and the injection openings with the smaller opening cross sections are directed toward regions of the piston recess with a smaller flow cross section.

6. The self-igniting internal combustion engine of claim 1, wherein the piston recess is not rotationally symmetric in relation to a longitudinal center axis of the cylinder and the piston.

7. The self-igniting internal combustion engine of claim 1, wherein the piston recess has multiple planes of symmetry whose number corresponds to a number of the pairs of injection openings, and wherein each of the flow cross sections of the piston recess has a maximum or a minimum in one of the planes of symmetry and decreases from the maximum or increases from the minimum up to a neighboring one of the planes of symmetry.

8. The self-igniting internal combustion engine of claim 1, wherein the piston recess has a convexly curved outer circumference, wherein a radius of curvature of said outer circumference is greater in regions of the piston recess having greater said flow cross sections, than a radius of curvature of said outer circumference in regions of the piston recess having smaller said flow cross sections.

9. The self-igniting internal combustion engine of claim 1, wherein the piston recess has an outer circumference free of discontinuities.

10. The self-igniting internal combustion engine of claim 1, wherein the piston recess has a key-shaped cross section with an extended bulge portion, and a narrowed neck portion between the bulge portion and a site of entry of the piston recess into a plane front surface of the piston.

11. The self-igniting internal combustion engine of claim 1, further comprising a substantially pyramid-shaped projection, said projection projecting upwards from a center of the piston recess over a bottom of the piston recess and having rounded corners and a rounded tip.

* * * * *